(12) United States Patent
Cullier et al.

(10) Patent No.: US 7,686,336 B2
(45) Date of Patent: Mar. 30, 2010

(54) STEERING COLUMN ASSEMBLY

(75) Inventors: Dominique Cullier, Houlgate (FR); Niclas Davies, Swansea (GB); Michael Appleyard, Cheltenham (GB); David Ward, Wales (GB)

(73) Assignee: TRW LucasVarity Electric Steering Limited (GB)

( * ) Notice: Subject to any disclaimer, the term of this patent is extended or adjusted under 35 U.S.C. 154(b) by 643 days.

(21) Appl. No.: 11/513,496

(22) Filed: Aug. 31, 2006
(Under 37 CFR 1.47)

(65) Prior Publication Data
US 2007/0138781 A1 Jun. 21, 2007

(30) Foreign Application Priority Data
Sep. 1, 2005 (GB) .................................. 0517781.1

(51) Int. Cl.
*B62D 1/18* (2006.01)
(52) U.S. Cl. ......................................... 280/775; 74/493
(58) Field of Classification Search ................. 280/775; 74/493
See application file for complete search history.

(56) References Cited

U.S. PATENT DOCUMENTS

| | | | |
|---|---|---|---|
| 4,648,624 A | | 3/1987 | Mouhot et al. |
| 5,117,707 A | * | 6/1992 | Kinoshita et al. ............. 74/493 |
| 5,722,299 A | | 3/1998 | Yamamoto et al. |
| 7,328,917 B2 | * | 2/2008 | Sawada et al. ............... 280/775 |
| 7,354,069 B2 | * | 4/2008 | Yamada ....................... 280/775 |

FOREIGN PATENT DOCUMENTS

| | | |
|---|---|---|
| EP | 0 368 700 A1 | 5/1990 |
| EP | 0 498 126 A1 | 12/1992 |
| EP | 1 223 096 A1 | 7/2002 |
| GB | 776357 | 6/1957 |
| GB | 2 304 866 A | 3/1997 |
| GB | 2 380 243 A | 4/2003 |

\* cited by examiner

*Primary Examiner*—Ruth Ilan
(74) *Attorney, Agent, or Firm*—MacMillan, Sobanski & Todd, LLC

(57) ABSTRACT

A steering column assembly includes a steering column shroud which supports a steering shaft for a steering wheel. The column shroud includes an inner member and an outer member. The inner member being at least partially received within the outer member. A support bracket is fixed in position relative to a part of the vehicle. A clamp mechanism is movable between a locked position in which the clamp mechanism fixes the inner member and the outer member in position relative to the support bracket and an unlocked position in which the clamp mechanism permits movement of at least one of the inner and outer members relative to the support bracket. The clamp mechanism includes a clamp pin that passes through an opening in the support bracket and is connected to a loop plate. The loop plate includes at least one loop portion that loops a portion of the shroud and which is drawn towards the support bracket as the clamp mechanism is moved to a locked position, thereby to clamp the shroud in position relative to the support bracket.

11 Claims, 5 Drawing Sheets

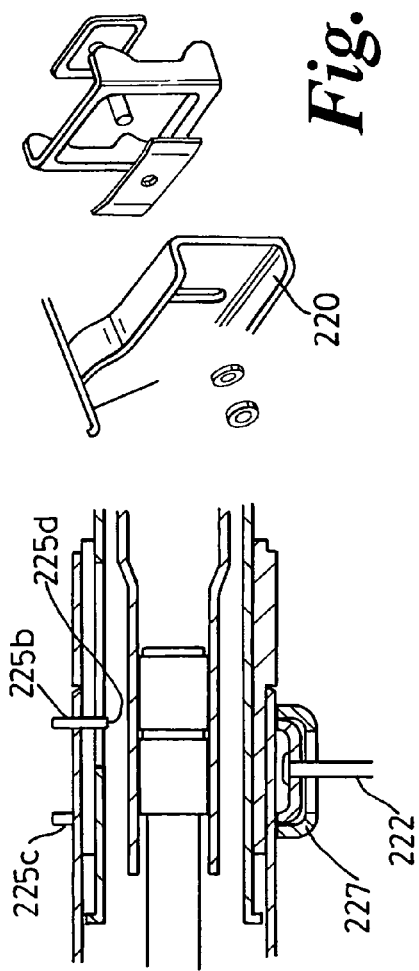
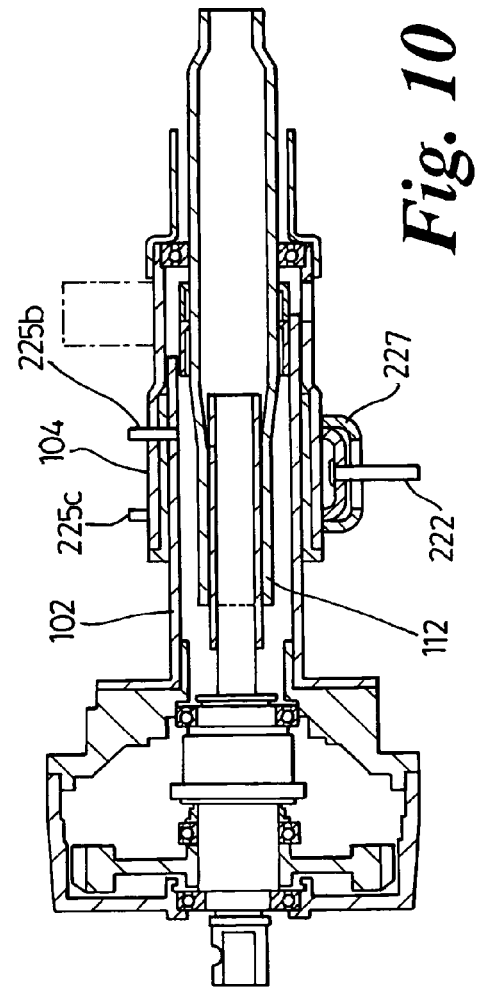

STEERING COLUMN ASSEMBLY

CROSS-REFERENCE TO RELATED APPLICATIONS

This application claims the priority of Great Britain Patent Application No. 0517781.1 filed Sep. 1, 2005, the disclosure of which is incorporated herein by reference.

BACKGROUND OF THE INVENTION

This invention relates to improvements in steering column assemblies.

Steering column assemblies for automotive vehicles and the like are increasingly required to be adjustable for rake and, in many cases, reach. This requires the column shroud, within which the steering column is rotatably located, to be fixed to the vehicle by a clamp mechanism which can be locked and unlocked to either prevent movement or permit adjustment of the column shroud position respectively.

One common arrangement uses a column shroud which comprises two tubular members which telescope one inside the other to permit reach adjustment. A fixing rail welded to one of the tubes is secured to a support bracket by the releasable clamp mechanism. Rake adjustment can be achieved by providing a support bracket which includes vertically aligned slots through which the clamp mechanism passes. The clamp mechanism, which is secured to the fixing rail, can be moved vertically within these slots, taking the column with it to adjust rake.

BRIEF SUMMARY OF THE INVENTION

According to a first aspect there is provided a steering column assembly comprising a steering column shroud which supports a steering shaft for a steering wheel, the column shroud comprising an inner member and an outer member, the inner member being at least partially received within the outer member, a support bracket which is fixed in position relative to a part of vehicle, and a clamp mechanism which is movable between a locked position in which the clamp mechanism fixes the inner member and outer member in position relative to the support bracket and an unlocked position in which the clamp mechanism permits movement of at least one of the inner and outer members relative to the support bracket. In which the clamp mechanism comprises a clamp pin that passes through an opening in the support bracket and is connected to a loop plate, the loop plate comprising a least one loop portion that loops a portion of the shroud and which is drawn towards the support bracket as the clamp mechanism is moved to a locked position, thereby to clamp the shroud in position relative to the support bracket.

Providing a loop which passes around the shroud and is tightened like a noose as the clamp mechanism is locked provides a robust means of securing the shroud to the support bracket.

A saddle may be provided between the support bracket and the outer shroud, the loop plate clamping the shroud to the saddle. This may be shaped complimentary to the portion of the shroud it engages to apply an even pressure. As the loop is pulled towards the support bracket it will squeeze the shroud onto this saddle. It may comprise a block which includes an opening through which the clamp pin passes.

The connection of the pin to the loop plate may be formed by passing the clamp pin through an opening in the loop plate and providing a nut or fixed head on the end of the pin which is located on the opposite side of the opening to the support bracket, the head or nut being so constructed that it will preferably not withdraw through the opening in the loop plate as the clamp is locked. Alternatively, the loop plate may be formed integral to the pin, or may be secured by a threaded engagement or welding or the like.

The loop plate most preferably comprises two loop portions that each loop around the shroud at axially spaced locations, each loop portion extending preferably orthogonally from a base portion. This can be conveniently formed by folding a flat plate along two spaced fold lines to define the base and two loops.

The clamp pin may be located alongside the shroud, its axis orthogonal to and passing substantially through the axis of the outer shroud member. This is a lateral clamping arrangement and is advantageous because it takes up little space below the steering shroud where they could obstruct a driver's legs. The support bracket in such an arrangement preferably includes a fixing arm that extends downwards alongside the shroud from a body located above the shroud which is to be fixed to the vehicle.

The clamp shaft may be moved relative to the support arm by a cam located between the support and a fixed or adjustable nut or bolt head secured to the shaft. The cam may be operated by a lever as is well known in the art, rotation of the lever increasing or decreasing the spacing between the nut or head and the support bracket.

The width of each loop in a direction parallel to the axis of the shroud, which will be determined by the thickness of the material used in the case of a loop formed from a sheet of material, generally determines the pressure applied to the shroud for a given clamp force. This in turn determines how much the shroud will deform, and is used in determining the friction present between the inner and outer portions in some arrangements.

To help control this deformation, the loop or each loop may be provided with one of several different internal profiles. The inner profile of the loop may be substantially complimentary to the shroud such that it applies even pressure over an arc of at least 90, or perhaps up to 180 degrees from a point on the tube diametrically opposite the location of the pin.

Alternatively, the inner profile may include one or more protrusions which contact the shroud before other adjacent portions and so apply regions of increased pressure. There may be one or more, and preferably four or eight such protrusions.

One of more of the loops formed by the loop plate may include an opening through which the shroud passes that is non-circular, preferably oval having its long axis parallel to the axis of movement of the clamp shaft. This is preferably chosen with the minor diameter of the oval substantially the same as the diameter of the outer portion of the shroud.

One or more teeth may be provided which extend inwardly from the loop and which engage in a slot formed in the outer shroud. This slot preferably extends axially along the shroud so that the tooth will be retained in the slot during reach adjustment. The width of the tooth and slot should be chosen so that the tooth prevents any rotation of the loop and/or shroud relative to one another and the support bracket during tightening.

According to a second aspect the invention, there is provided a steering column assembly comprising a steering column shroud which supports a steering shaft for a steering wheel, the column shroud comprising an inner member and an outer member, the inner member being at least partially received within the outer member, and an energy control member which in normal use is located around at least a part of the inner member over which the outer member is intended to collapse in the event of a collision, the energy control member comprising a support layer which is located around the inner member and is so constructed and arranged to at least partially slide into the outer member upon collapse, and one or more protruding ridges which protrude sufficiently that they are at least partially sheared off by the outer member as it collapses over the inner member.

The first and second aspects may be combined, with any of the features of each invention being readily combined with the others.

The inner and outer members are preferably tubular, and most preferably tubular cylindrical, as is the support portion of the energy control member. The inner and outer members are preferably of metal, and the energy control member is preferably of plastic or rubber material, or at least the ridges are.

The ridges preferably extend axially along the energy control member, i.e. aligned with the axis of travel of the inner and outer members in the event of a collapse of the steering assembly.

The ridges may have a square or rectangular or triangular cross section. They may be wider at their base than at the top, and may vary in cross section along their length or be of substantially uniform cross section.

When used in combination with the loop plate clamping mechanism, the energy control member may be located at least partially within the space between the inner and outer members of the column shroud that is enclosed by the loop plate such that the compression of the outer member clamps the energy absorbing member to the inner member.

The energy absorbing member may be designed to provide one of a variety of different stroke-force characteristics. A typical requirement is for a collapse travel of around 75 mm measured from the nominal mid position of the column and to absorb 300 Joules over this stroke. This equates to an average crash force of around 4000N or more. The assembly may be arranged such that during an initial portion of collapse the outer tube does not shear any of the ridges, whilst in a second stroke it does so that the crash force increases over the second portion. Alternatively, only a subset of the ridges may shear over the initial travel by providing ridges of different length and positioning or cross section.

In the prior art it is known to provide support brackets which include teeth stamped into a surface alongside the rake adjustment slot to prevent accidental rake movement under load. The applicant has realised that teeth of this type are inherently soft and may wear prematurely if frequent adjustment is made.

Therefore, according to a third aspect the invention, there is provided a support bracket for a steering column assembly which includes a support body including at least one slot adapted to receive a portion of a clamp mechanism, the slot permitting movement of the portion of the clamp pin so as to permit rake adjustment of the steering column assembly, and in which the support bracket includes a separate toothed metal component which is fixed in place on the support body.

The separate toothed component may be a sintered block or, most preferably comprises a metal plate in which the teeth are formed prior to hardening of the metal.

The invention may also extend to a method of producing a support bracket in which a plate has teeth formed in it, is then hardened and is then riveted to the support bracket.

The applicant has appreciated that this offers increased security whilst being relatively simple and inexpensive to construct.

Other advantages of this invention will become apparent to those skilled in the art from the following detailed description of the preferred embodiments, when read in light of the accompanying drawings.

BRIEF DESCRIPTION OF THE DRAWINGS

FIG. 9 is a still further exploded view of a detail of the clamp mechanism;

FIG. 10 is a plan view in cut away of an alternative embodiment of a steering column assembly in accordance with an aspect of the present invention.

DETAILED DESCRIPTION OF THE INVENTION

Figure 1:
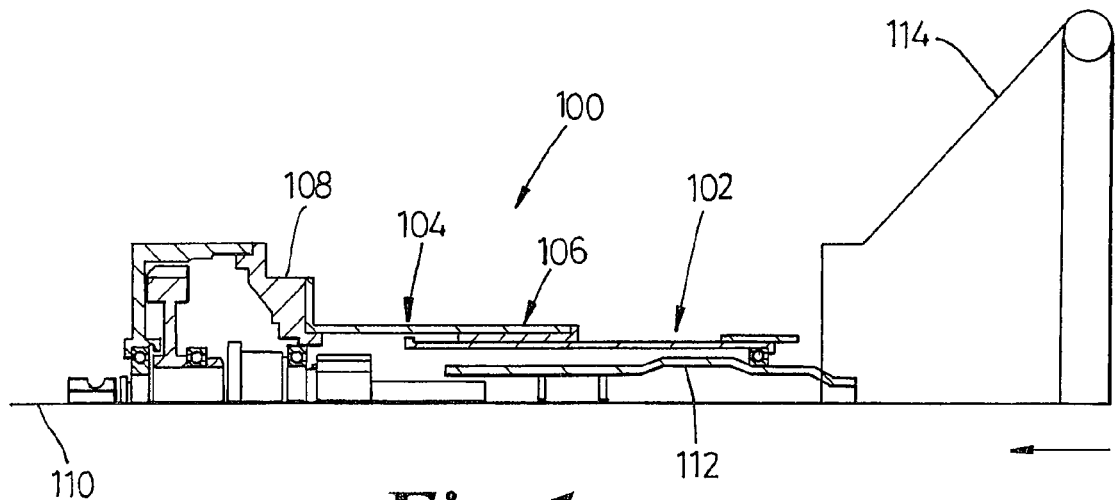
FIG. 1 is a part plan view in cut-away of an embodiment of a steering column assembly in accordance with a first aspect of the present invention.

As shown in the part plan sectional view of FIG. 1, a steering column assembly 100 comprises an inner member 102 and an outer member 104 which receives a portion of the inner member. The inner and outer members 102,104 are of metal and tubular cylindrical with the inside diameter of the outer member 104 preferably being only slightly greater than the outside diameter of the inner member 102 so as to permit relative movement,between them by sliding. A bush 106 is provided in the gap between the inner member and outer member which provides for some energy absorption in the event of a collapse. In the example, the inner member passes into a gearbox housing 108 whilst the outer member extends away from that towards a steering wheel 110. The wheel is supported by a telescopic steering shaft 112 that is free to rotate within the steering column shroud. In other arrangements the outer shroud member may connect to the gearbox housing and the inner extend away from that.

The steering column shroud 102,104 is fixed pivotally to a part of the vehicle body at a point 110 and also to a support bracket (not shown in FIG. 1 but visible in FIGS. 2, 5, 6, 7, 8 and 9) secured to the body of the vehicle by a clamp mechanism. The bracket 200 is typically welded or bolted in place in a region under the dashboard and clamps the shroud at a point somewhere between the pivot and the steering wheel. The clamp mechanism can be locked or unlocked to allow the rake of the steering column to be adjusted by pivoting about the pivot. When locked the steering column cannot be moved other than in an accident.

Figure 2:
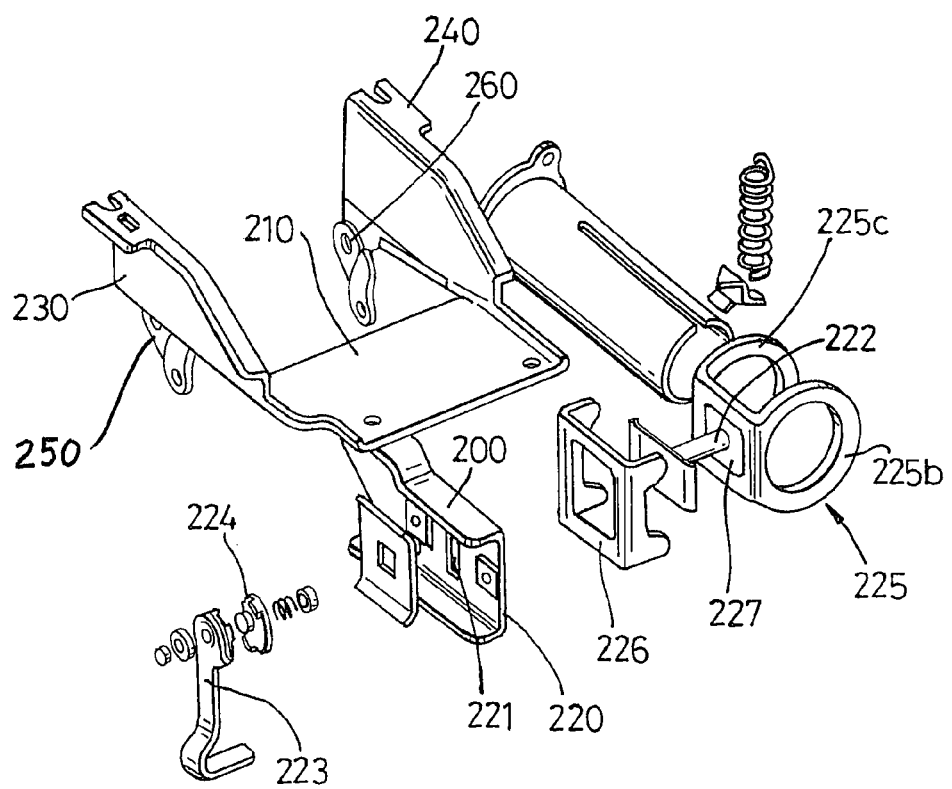
FIG. 2 is an exploded view of the steering column assembly of FIG. 1 including its support bracket and clamp mechanism.
Figure 3:
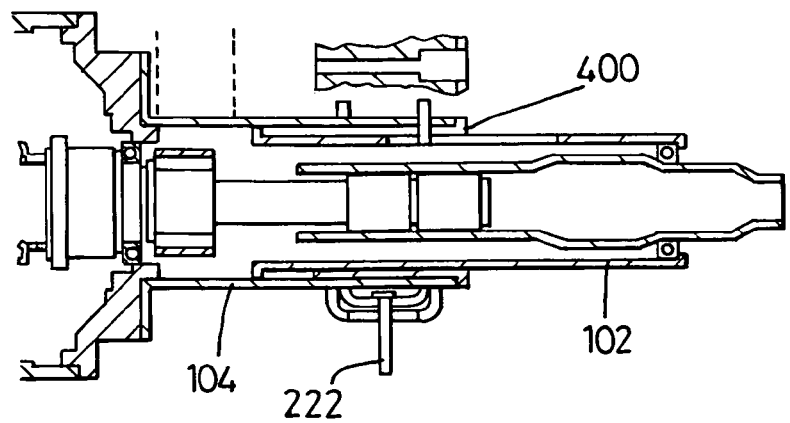
FIG. 3 is an alternative plan cut-away view of the steering column assembly of FIG. 1 showing the energy control member.
Figure 4:
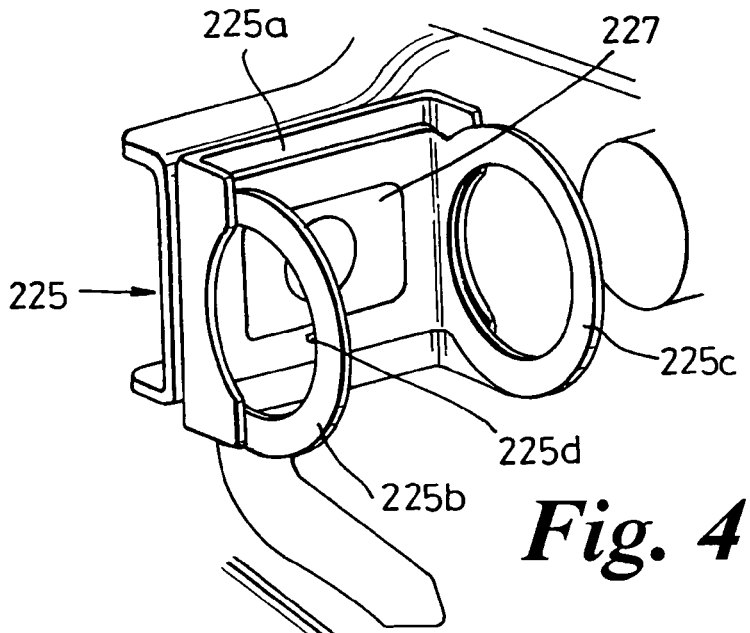
FIG. 4 is an enlarged isometric view of the loop plate and saddle of the assembly of FIG. 1.

The bracket 200 is shown in detail in FIG. 2 along with the components of the clamp mechanism. It comprises a folded metal component having a base 210 and a fixing arm 220 which extends vertically downwards from one side of the base 210 and towards the front of the base (i.e. the part of the base nearest the steering wheel). Two mounting arms 230,240 extend upwards from the base for connection to a part of the vehicle body. Two other arms 250,260 depend downwards from the rear of the base. Each of these provide a location hole for a pair of co-axial pivot pins which each connect to a part of the steering or gearbox and define the axis 110 about which the shroud will pivot for rake adjustment.

The front fixing arm 220 provides a mounting point for a clamp mechanism which clamps the shroud in place. It is positioned such that when the shroud is located it is alongside the outer portion of the shroud. It includes a vertically aligned slot 221 through which a clamp pin or bolt 222 can pass with a cam locking mechanism including a fixed portion 223 and moving portion 224 being provided on the side of the fixing arm opposite the shroud. The other end of the shaft is connected to a loop plate 225 which loops around the outer portion of the shroud. Between the outer portion 104 and the fixing arm 220 is a saddle plate 226 which includes an opening through which the clamp bolt passes before connecting to the loop plate 225.

The loop plate 225 comprises a metal sheet which is folded into a u-shape. The base 225a of the plate includes a rectangular opening which receives a bolt head 227 formed on the end of the clamp bolt. The head is sized so that it preferably cannot be withdrawn through the opening in the base of the loop plate 225. The loop plate 225 also includes two arms 225b, 225c of the plate is generally oval and includes an oval opening generally concentric with the outer shape so that each arm is in effect a closed loop. These two closed loops formed by the arms loop around the outer portion of the shroud at spaced locations.

The saddle plate 226 is sized such that it fits clear around the loop plate base portion of the loop and acts as chock between the outer portion of the shroud and the fixing arm 220.

In use, the cam mechanism acts to draw the clamp bolt away from the outer member 104 of the shroud when moved from an unlocked to a locked position. This pulls the loop plate 225 towards the fixing arm 220, in turn pulling the outer member 104 of shroud with it. However, this movement is resisted by the saddle 226 wedged between the outer member 104 and the fixing arm 220, and the result is that the loop and saddle squeeze the outer member so that the column is locked in place.

Figure 11:
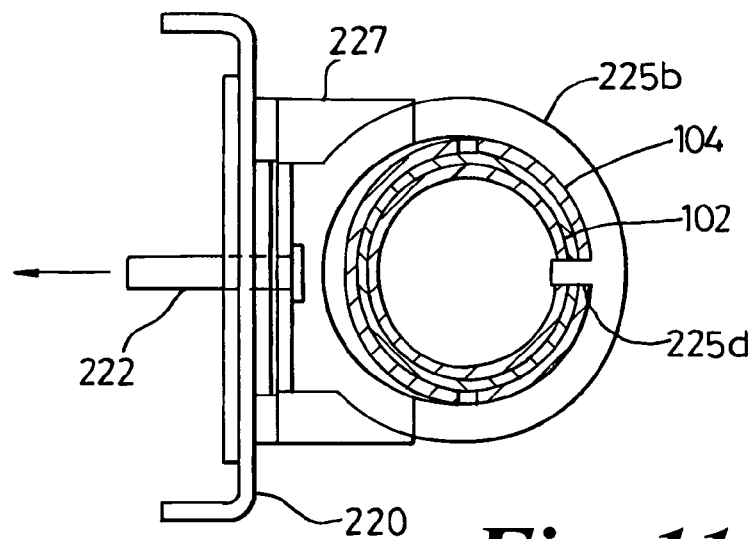
FIGS. 11 to 13 illustrate various shapes of loop plate and outer shroud member which can be employed within the scope of the invention.
Figure 12:
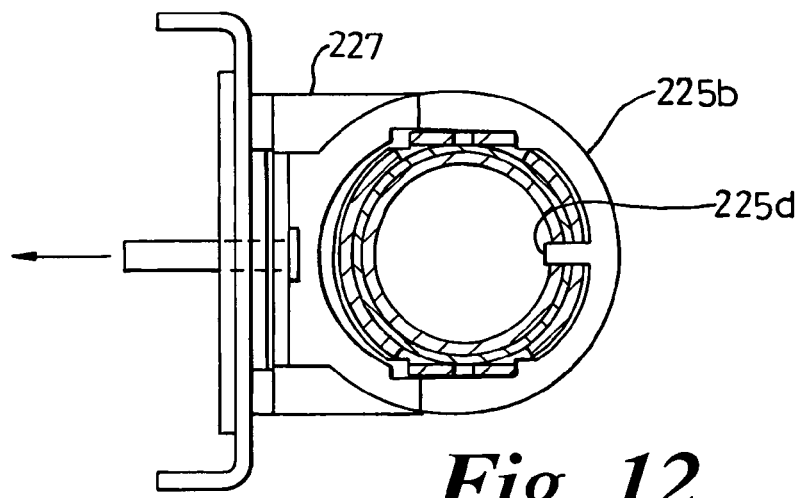
Figure 13:
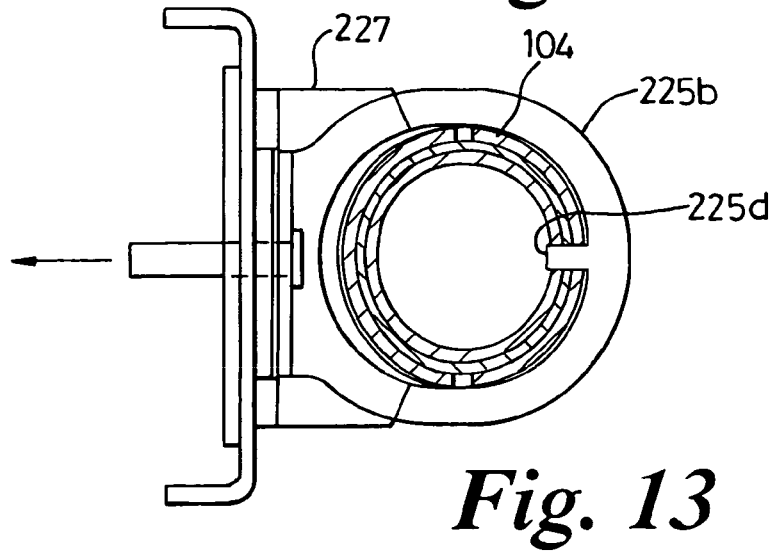

The loops of the loop plate may have a number of different internal profiles as shown in FIGS. 11 to 13. FIG. 11 shows a unidirectional arrangement in which the loops apply uniform tension around a continuous part circumference of the outer member of the shroud. FIG. 12 shows an arrangement in which lateral forces are applied at spaced locations around a part circumference of the outer member of the shroud. This creates a wrapping action. A number of inward facing protrusions are provided on the loop which co-operate with various local features on the outer member to achieve this. FIG. 13 shows an arrangement in which radial forces are applied at spaced locations around the outer member. This requires local protrusions to be provided on either the plate loops or the outer member, although they could be provided on both. In each case one or more slots are also provided in the outer member 104 which will close up as clamping is applied to cause the outer member to grip the inner shroud member.

Also clearly visible in FIGS. 11 to 13 is a location tooth 225d which extends inwardly from one of the loops of the loop plate. This tooth engages a slot in the outer member to help locate the loop and outer member and prevent them rotating when the clamp is locked. It is also shown passing into a corresponding slot in the inner shroud member. In addition to squeezing the outer shaft against the saddle, the loop and saddle will deform the outer portion if a sufficiently high force is applied. This can be exaggerated by providing a slit in the outer portion of the shroud which runs along its length at least over the part squeezed by the loop. As the loops squeeze the outer portion the slit may close up which can cause the outer portion to grip the inner portion. This is advantageous as it permits simultaneous clamping of the inner and outer portions in one action.

Figure 5:
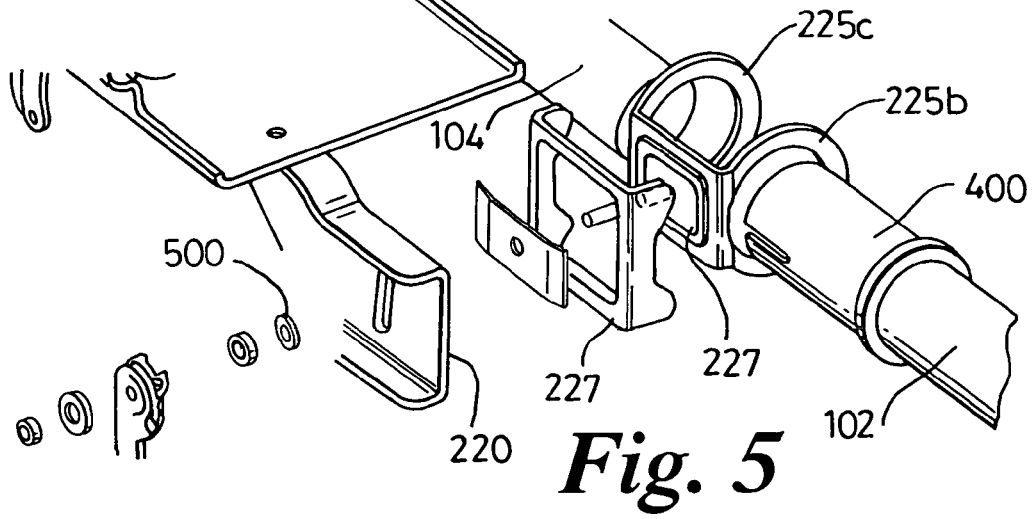
FIG. 5 is an alternative exploded view of the part of the assembly of FIG. 1 showing the location of the components of the clamp mechanism.

FIG. 5 shows an additional, optional, feature which enables the amount of free play in the clamp mechanism when in the unlocked position to be controlled. It comprises a star shaped washer 500 that is slid onto a plain portion of the clamp bolt 222 during assembly and prior to addition of the cam mechanism and adjustable nut. This star washer 500 generally sets the maximum free play, and while it is easy to slide on, it is generally prevented from working loose by its internal teeth which become splayed on assembly. An alternative, not shown, would be to provide an additional lock nut and to provide a thread over the portion of the pin that passes out of the opening in the support bracket.

Figure 7:
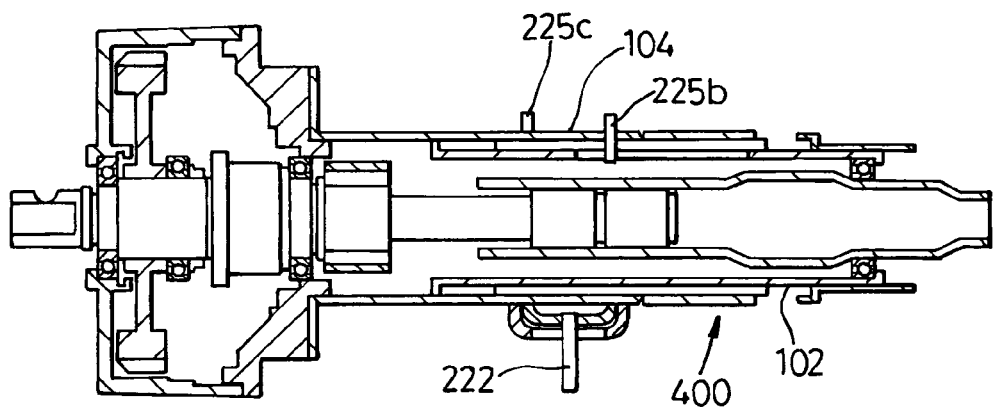
FIG. 7 is a still further plan view of the assembly of FIG. 1 illustrating the range of relative movement of the inner and outer shroud members in a collapse.
Figure 8:
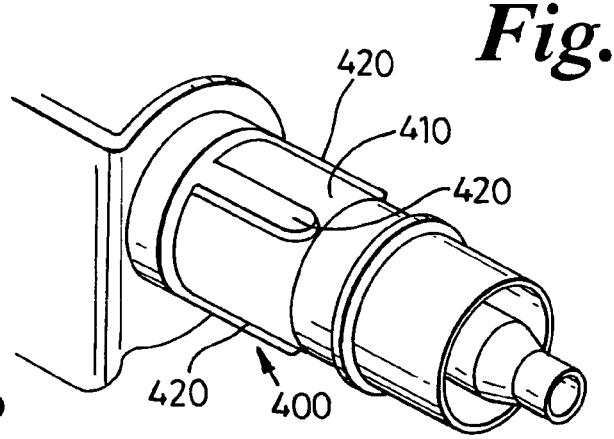
FIG. 8 is a detailed isometric view of the energy absorbing member of the assembly of FIG. 1.

FIGS. 5, 7 and 8 show an additional feature that can be applied to a steering column assembly in accordance with a third aspect of the invention. This comprises an energy absorbing member 400 in the form of a bush which is provided around the outside of a length of the inner shroud portion 102. It comprises a tubular sleeve 410 which is a close fit to the inner portion 102, perhaps as a press fit or even a coating. The sleeve 410 has a plurality of protruding strips or fins 420 which extend radially out from the tubular sleeve 410. The external diameter of the sleeve 410 is chosen to be less than the inner diameter of the outer tubular shroud member 104, but the ridges are chosen to protrude radially greater than the inner radius of the outer tubular member.

In normal use, the region of the bush carrying the strips is located outside of the outer portion 104 of shroud, although some of the tubular support may be located within the outer portion. In the event of a crash, the outer member is forced to ride over the inner portion until it reaches the strips, whereupon the outer member shears the strips off as the bush is driven into the other member. This shearing action will provide force opposing movement, and by careful selection of the number of strips, the material used and their size and orientation and accurate controlled collapse force can be provided.

The energy control member 400 may be located on the inner portion by a protruding ridge provided on the inner portion at the end of the energy control member furthest from the outer portion of the shroud.

Figure 6:
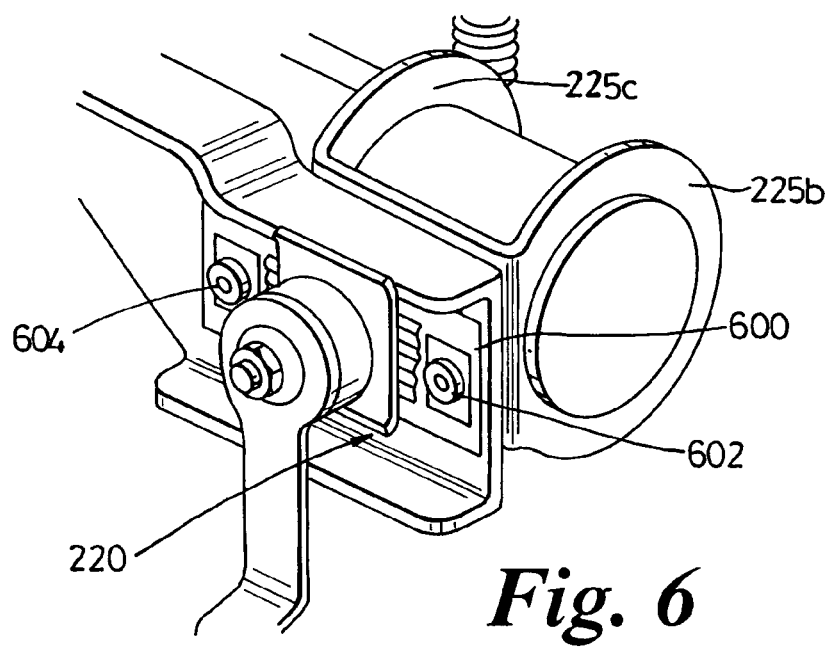
FIG. 6 is an enlarged view of a detail of the assembly of FIG. 1 showing the location of a toothed plate to lock the rake of the assembly.

FIG. 6 illustrates an additional, optional feature of an embodiment of a steering column assembly within the scope of the present invention in at least one aspect. It is sometimes desirable to provide for a more positive location of the rake position of the column relative to the support bracket than can be provided through friction alone. To achieve this, a toothed plate 600 may be provided which is preformed from a sheet of material and subsequently hardened using a process such as Nitrotec. This is cheaper than providing a sintered teeth block. The hardened plate 600 is fixed to the support bracket 220 by rivets 602, 604 alongside the elongate substantially vertical slot in the support bracket. The teeth co-operate with corresponding teeth on a washer that is slid onto the clamp pin.

It is to be understood that whilst the use of cylindrical tubular inner and outer members and energy control bushes have been described in the example, other shapes could be employed within the scope of the invention, e.g. tubes having a rectangular or triangular or even an irregular cross section.

Additionally, whilst the embodiments illustrated in FIGS. 1 to 9 provide for the outer member to be connected to the gearbox and for the inner member to collapse into it, the opposite could be provided. An example of such an arrangement is shown in FIG. 10 of the accompanying drawings. Like parts are denoted by like reference numerals to those used in FIG. 1. It should be understood that this arrangement falls within the scope of protection that may be sought.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A steering column assembly comprising a steering column shroud which supports a steering shaft for a steering wheel, the column shroud comprising an inner member and an outer member, the inner member being at least partially received within the outer member, a support bracket which is fixed in position relative to a part of vehicle, and a clamp mechanism which is movable between a locked position in which the clamp mechanism fixes the inner member and outer member in position relative to the support bracket and an unlocked position in which the clamp mechanism permits movement of at least one of the inner and outer members relative to the support bracket, in which the clamp mechanism comprises a clamp pin that passes through an opening in the support bracket and is connected to a loop plate, the loop plate comprising at least one closed loop portion that loops and encloses a portion of the shroud and which is drawn towards the support bracket as the clamp mechanism is moved to a locked position, thereby to clamp the shroud in position relative to the support bracket.

2. A steering column assembly according to claim 1 wherein a saddle is provided between the support bracket and the shroud, the loop plate clamping the shroud to the saddle.

3. A steering column assembly according to claim 2 wherein the saddle comprises a block which includes an opening through which the clamp pin passes.

4. A steering column assembly according to claim 1, wherein the connection of the pin to the loop plate is formed by passing the clamp pin through an opening in the loop plate and providing a nut or fixed head on the end of the pin which is located on the opposite side of the opening to the support bracket, the head or nut being so constructed that it will not withdraw through the opening in the loop plate as the clamp is locked.

5. A steering column assembly according to claim 1, wherein the loop plate comprises two loop portions that each loop around the shroud at axially spaced locations, each loop portion extending orthogonally from a base portion.

6. A steering column assembly according to claim 1, wherein the clamp pin is located alongside the shroud, its axis orthogonal to and passing substantially through the axis of the outer shroud member.

7. A steering column assembly according to claim 1 wherein an inner profile of the loop portion is substantially complimentary to the shroud such that it applies even pressure over an arc of between about 90 and 180 degrees from a point on the tube diametrically opposite the location of the pin.

8. A steering column assembly according to claim 1 wherein an the inner profile of the loop portion includes one or more protrusions which contact the shroud before other adjacent portions and so apply regions of increased pressure.

9. A steering column assembly according to claim 1 wherein the loop portion includes an opening through which the shroud passes that is non-circular.

10. A steering column assembly according to claim 9, wherein the opening is oval having a long axis parallel to the axis of movement of the clamp shaft.

11. A steering column assembly according to claim 1 wherein one or more teeth are provided which extend inwardly from the loop and which engage in a slot formed in the outer shroud.

* * * * *